United States Patent [19]

Gusack et al.

[11] Patent Number: 4,624,817
[45] Date of Patent: Nov. 25, 1986

[54] DILATABLE, INDIVIDUALLY CAST COATING DIE

[75] Inventors: James A. Gusack; Thomas E. Smith, both of Williamsburg, Va.

[73] Assignee: Badische Corporation, Williamsburg, Va.

[21] Appl. No.: 611,565

[22] Filed: May 18, 1984

[51] Int. Cl.⁴ .................. B29C 67/00; B23P 11/00; B23P 19/04; B05C 3/02
[52] U.S. Cl. ............................ 264/225; 29/434; 29/460; 118/125; 118/404; 118/405; 118/DIG. 18
[58] Field of Search ....... 118/125, 404, 405, DIG. 18; 427/356, 358, 434.6, 434.7; 76/101 R, 107 R, 107 A; 264/225; 29/434, 460

[56] References Cited

U.S. PATENT DOCUMENTS

| | | | |
|---|---|---|---|
| 3,390,662 | 7/1968 | Wood | 118/125 |
| 3,473,512 | 10/1969 | Wood | 118/125 |
| 4,046,103 | 9/1977 | Yakuhoff | 118/405 X |
| 4,130,676 | 12/1978 | Ichiyanagi et al. | 118/405 X |
| 4,426,954 | 1/1984 | Keller | 118/405 |

*Primary Examiner*—Michael R. Lusignan
*Attorney, Agent, or Firm*—Rupert B. Hurley, Jr.

[57] ABSTRACT

Disclosed is a coating die which has a dilatable orifice, the orifice being dilatable due to the use of a flexible, resilient portion of the die. The die is individually cast and is "strung-up" in the casting process. The preferred use for the die is in the coating of textile filaments, especially small diameter filaments that are slubby.

11 Claims, 11 Drawing Figures

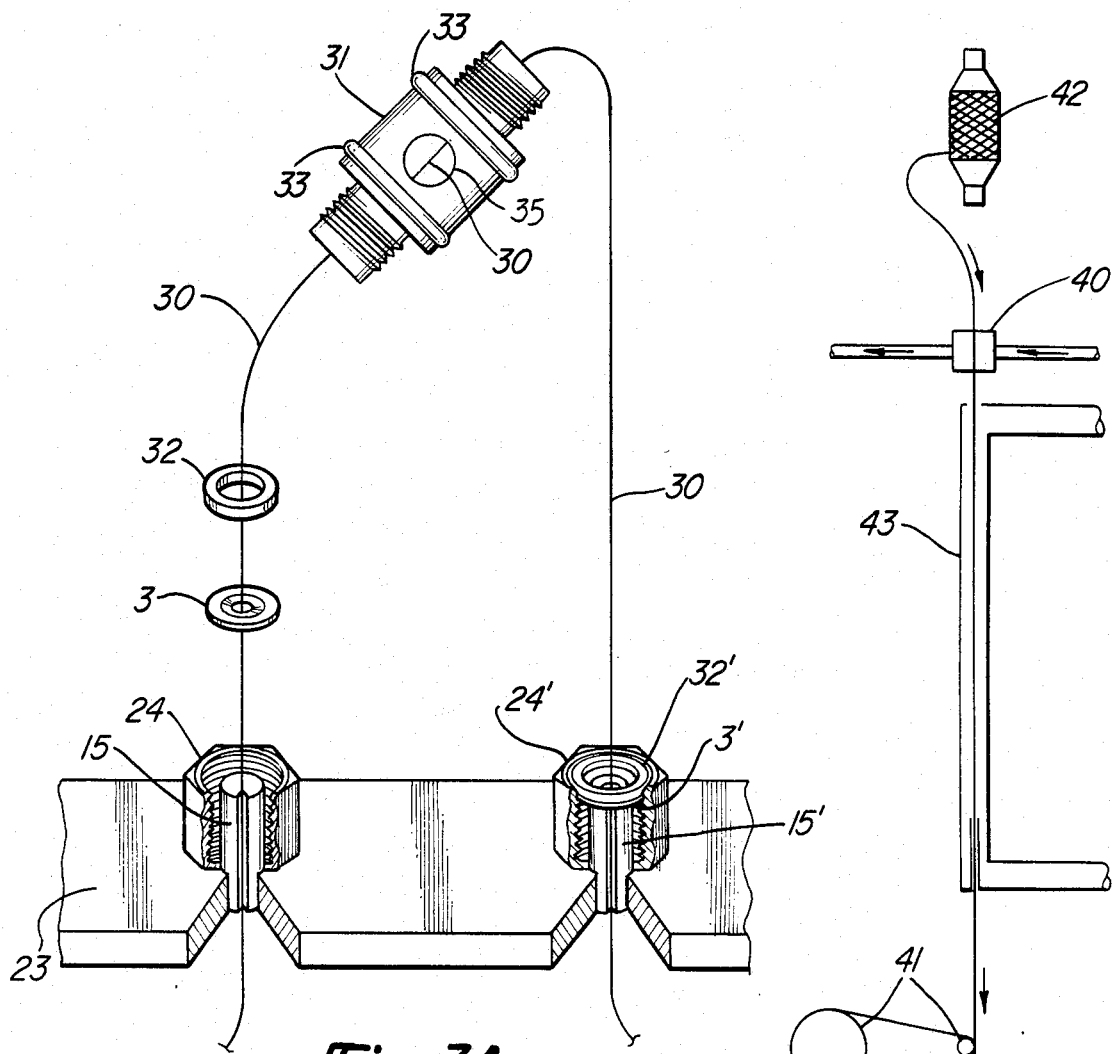
*Fig-3A*
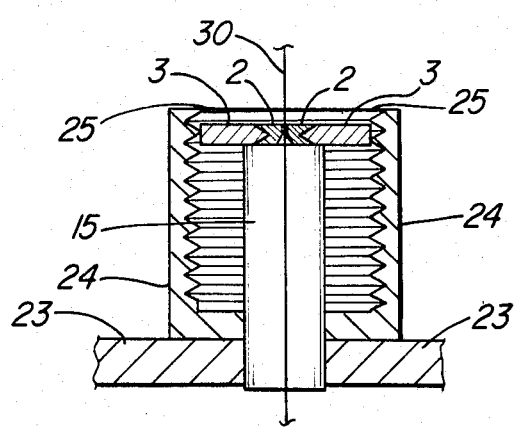
*Fig-3B*
*Fig-4*

DILATABLE, INDIVIDUALLY CAST COATING DIE

BACKGROUND OF THE INVENTION

1. Field of the Invention

The present invention pertains to the field of coating apparati, more specifically to a coating apparatus wherein a solid member or material acts on the coating after application thereof, the coating being applied to running length work which passes through a die. The invention also pertains to the field of coating apparati of the immersion or work-confined pool type, in which running length work extends through a pool confining wall area.

2. Description of the Prior Art

Applicants are aware of several prior art U.S. patents which are related to the present invention, including: U.S. Pat. Nos. 2,314,168; 3,390,662; 3,473,512; 2,952,240; 2,193,887; 3,840,384; and 3,874,329. Applicants do not believe that any of these prior art patents are close enough to the present invention to warrant any detailed discussion, as none of these patents discloses all of the elements required in each of the claims of the instant specification. The claims herein are directed to a dilatable, individually cast coating die having: (a) a die having integral inner and outer portions, (b) an inner portion which is substantially undistorted upon being fastened to the outer portion.

BRIEF SUMMARY OF THE INVENTION

The present invention is concerned with a coating die, a method of making the die, and a method of using the die. The die is cast of a flexible material having a Shore A Hardness Value between 20 and 100. Most preferably the die is thin and dilatable so that in the coating of relatively small, weak strands, the strand does not break even though the strand contains enlarged portions that have cross sectional areas significantly greater than the cross sectional area of the passageway through the inner portion. Such is the case with a slubby textile filament being passed through a dilatable passageway that is slightly larger than the average filament diameter.

The die of the present invention is comprised of a resilient inner portion and a substantially nondeformable outer portion. The resilient inner portion has an internal surface (defined infra) which defines a passageway through the inner portion. The passageway has a diameter "d". The inner portion is surrounded by an outer portion, the outer portion being substantially nondeformable. The outer portion provides rigid surfaces for mounting the die in a desired location. The outer portion has a perforation therein, the perforation being formed by surfaces that are provided for fastening the inner portion to the outer portion in a manner so that the outer portion and the inner portion are integral and so that the resilient inner portion is substantially distortion-free. The outer portion has an innermost surface which is spaced at least the distance d from the passageway.

The process of coating a strand material is carried out by passing the strand material though a coating liquid, so that the strand is contacted by the liquid, followed by passing the strand material through a dilatable coating die as described above. The die is downstream of, and in contact with, the coating liquid.

A process of both making and stringing up the dilatable coating die is carried out by the following steps:

(1) mounting the nondeformable (outer) plate in a substantially horizontal position, the outer plate having a perforation therethrough, the perforation creating an internal surface, the internal surface being shaped in order to provide a fastening surface for a material which is to be cast therein;

(2) threading a yarn segment through the perforation, the yarn having a diameter d, the diameter d being the same size as the desired diameter of the passageway;

(3) positioning the yarn in a slit within a second plate which has been slit partially therethrough, the second plate being flexible and slittable, the second plate having a protrusion of a desired size out of the plane of the second plate, the slit passing through the protrusion, the protrusion being shorter than the thickness of the nondeformable plate, the protrusion fitting wholly within the perforation, the second plate being mounted directly underneath and in contact with the nondeformable plate so that a generally cup-shaped reservoir is formed by the nondeformable plate and the second plate, the yarn being positioned so that the yarn is, in every direction, spaced substantially at least a distance d from the internal surface which defines the perforation, the yarn being positioned so that it emerges from the protrusion at a desired distance from a plane containing the top surface of the nondeformable plate upon positioning the nondeformable plate, the second plate, and the yarn in order to form the reservoir;

(4) filling the reservoir with a desired amount of castable material, the amount being carefully controlled in order to control the length of the passageway;

(5) allowing the castable material to cure; and (6) removing the second plate while leaving the yarn segment threaded therethrough.

BRIEF DESCRIPTION OF THE DRAWINGS

FIG. 3A is a perspective view of a set up used to make and stringup the orifice of the present invention.

FIG. 3B is a cross-sectional view of the casting process used to make and stringup the die of the present invention.

FIG. 4 is a schematic of a process of using the die of the present invention.

DETAILED DESCRIPTION OF THE PREFERRED EMBODIMENTS

Figure 1A:
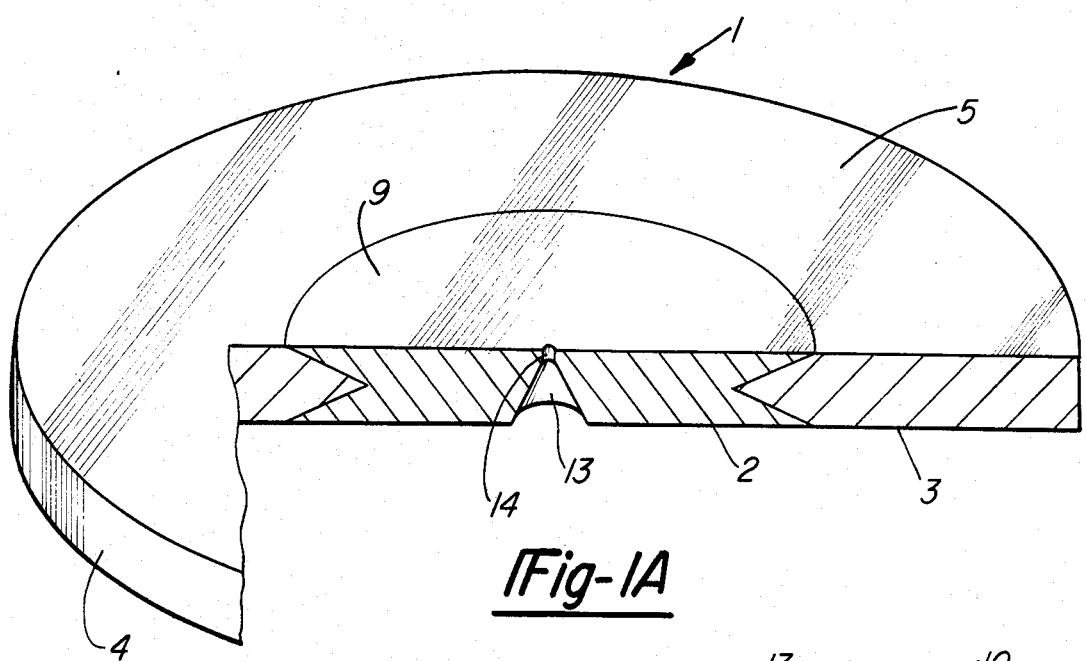
FIG. 1A is a perspective cut-away view of the orifice of the present invention.
Figure 1B:
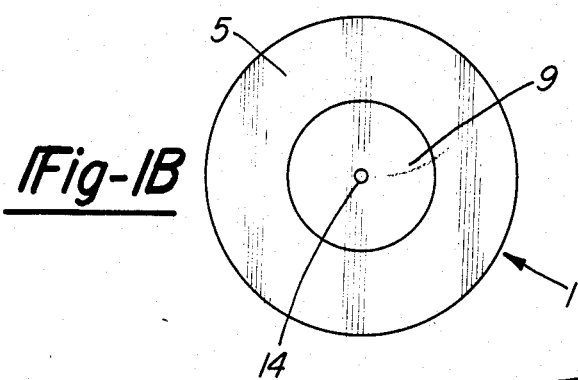
FIG. 1B is a top view of the orifice as shown in FIG. 1A.
Figure 1C:
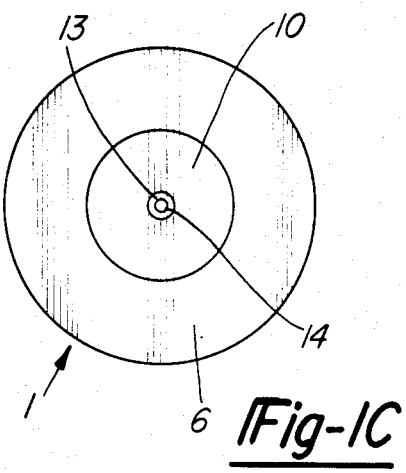
FIG. 1C is a bottom view of the die of the present invention.
Figure 1D:
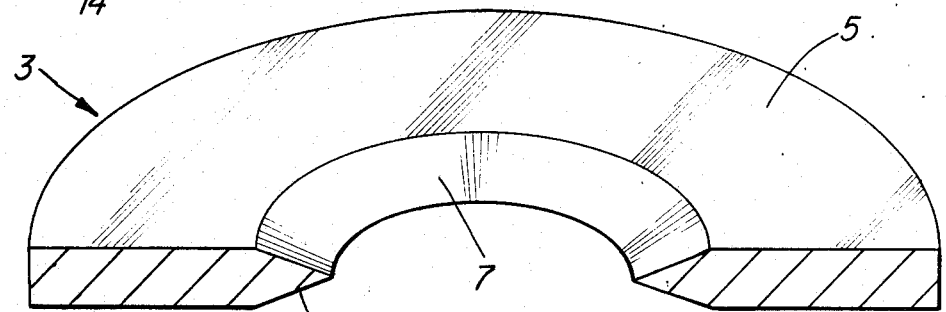
FIG. 1D is a perspective view of a cut-away of a portion of the die shown in FIG. 1A.
Figure 1E:
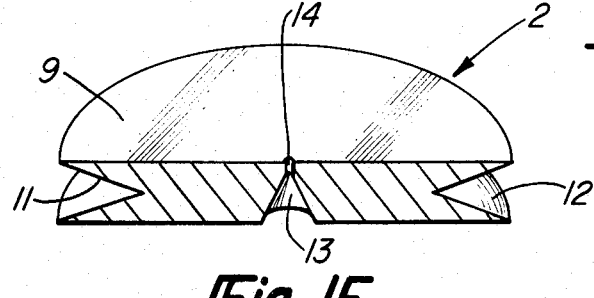
FIG. 1E is a perspective view of a cut-away of another portion of the die shown in FIG. 1A.

FIGS. 1A through 1E illustrate the die (1) of the present invention. The die (1) is comprised of a resilient inner portion (2) and a rigid, substantially nondeformable outer portion (3). The outer portion (3) is most preferably made of stainless steel. The outer portion (3) has several surfaces thereon, including an outer perimeter surface (4), a top surface (5), a bottom surface (6, as shown in FIG. 1C) and two inner perimeter surfaces (7 and 8, as shown in FIG. 1D). The resilient inner portion (2) is made from a deformable, resilient material which has a Shore A Hardness Value between 20 and 100. The inner portion (2) has several surfaces thereon, including a top surface (9), a bottom surface (10, see FIG. 1C), two outer perimeter surfaces (11 and 12, see FIG. 1E), and two inner perimeter surfaces (13 and 14). The outer perimeter surfaces (11 and 12) of the inner portion (2) fit directly against the inner perimeter surfaces (7 and 8) of the outer portion (3), forming a "keyway" fit. The volume within the inner surface (14) is herein defined as the "passageway", although strictly speaking an object can only pass through the inner portion (2) by moving past both inner perimeter surfaces (13 and 14). Inner surface (13) is most preferrably conic, and most preferably the passageway (i.e. the volume within the confines of surface 14) extends from the apex of the cone, with the axis of the passageway being the same as the axis of the cone. The inner perimeter surface 14, which defines the passageway, can dilate substantially in order to allow the passageway to enlarge. The passageway is most preferably short in length so that less deformation of the resilient inner portion (2) is required in order to allow a relatively large strand portion (i.e. a portion of a strand, the portion being larger than both the average strand diameter and the passageway) to pass through the die. The cross-sectional area of the passageway should be at least as large as the cross-sectional area of the strand material to be coated. In addition, it is preferable for the inner portion (2) to be constructed of a material which is flexible enough and resilient enough for a small, relatively weak strand having an elongated slub (or other elongated, enlarged portion) to be drawn through the die without breaking the strand off due to a tension increase caused by displacement of the flexible inner portion (2) of the die (1). For this reason, it is important to design the die so that, for a given use, the amount of displaced flexible material will be minimized and the ease of displacement of the flexible material will be maximized. Competing factors such as the pressure exerted on the die by a coating material which itself is under pressure, the abrasiveness of both the coating material and the strand, the temperature of the coating liquid, etc. also affect the selection of materials and the design parameters to be used in making the die. However, the main purpose of the die of the present invention is in the coating of textile filaments, these filaments generally having a diameter of less than $2 \times 10^{-2}$ inches, and sometimes less than $1 \times 10^{-3}$ inches.

In order to make and use the die for coating textile filaments having small diameters, the strand must somehow be threaded through the passageway. For these small filament diameters, it has been unexpectedly found that the best way to thread up these small orifices is to cast the orifice individually by casting the flexible inner portion (2) around a first strand of a desired diameter for the passageway. Excess strand length is used in order to tie onto the first strand with a second strand of smaller diameter, the second strand being the strand which is to be coated. It has been found that the knot connecting the first and second strands passes through the orifice without causing the small strand to break and without causing damage to the die. It has been conceived that the inner portion must be cast from a material having a Shore A Hardness Value between 20 and 100. It is preferred that the passageway have a length to diameter ratio (herein termed L/d) of between 3 and 20. It is more preferred that the L/d be between 5 and 15, and it is most preferred that the L/d be approximately 10. Furthermore, although the flexible material from which the inner portion (2) is made may have a Shore A Hardness Value between 20 and 100, it is preferred that the flexible material have a Shore A Hardness Value between 30 and 60, and it is most preferred that the flexible material have a Shore A Hardness Value of approximately 40.

As shown in FIGS. 1A-1E, the die of the present invention is comprised of two portions: an outer portion (3) and an inner portion (2). These two portions are integral, i.e. both portions may be handled as a single unit, or part. Furthermore, the flexible inner portion is held substantially undistorted within the rigid, substantially undeformable outer portion. The inner portion is held undistorted by the outer portion because the inner portion has been precisely sized so that it will fit within the outer portion. The precise sizing of the inner portion is preferably achieved by casting the inner portion within the outer portion. However, the precise sizing of the inner portion may also be achieved by casting or molding all of the inner portions to a specific, substantially identical size followed by machining all of the outer portions to a specific, substantially identical size, the outer portions being sized in order to accommodate the inner portions without distortion thereof. The inner portions could then be installed within the outer portions.

Figure 2A:
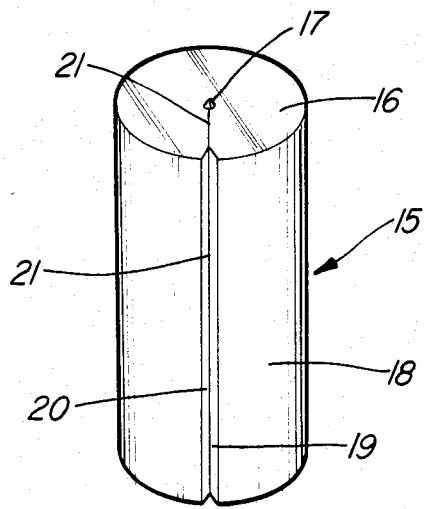
FIG. 2A is a perspective view of the second plate which is used in the process of making the die shown in FIG. 1A.
Figure 2B:
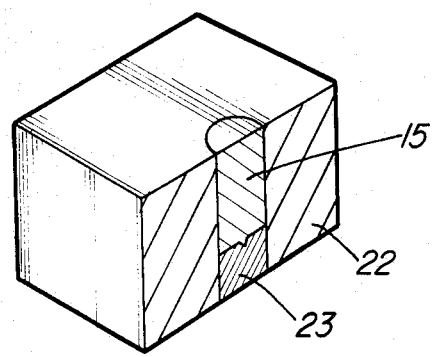
FIG. 2B is a sectional view of a process for casting the second plate.
Figure 2C:
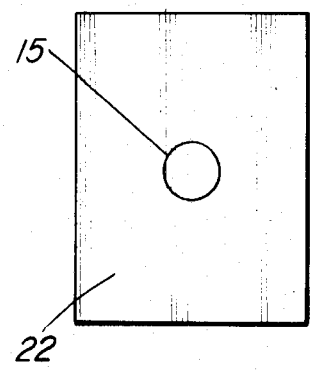
FIG. 2C is a top view of the casting process which is shown in FIG. 2B.

FIGS. 2A, 2B, 2C, 3A and 3B illustrate the process of making and stringing up the die of the present invention. FIG. 2A illustrates a "second plate" (15) which is both flexible and slittable. Although the "second plate" is longer than its diameter and therefore appears more cylindrical than plate-like, the functional surface of the second plate is its top, "horizontal" surface 16, hence the term "plate". The second plate (15) has several other functional surfaces thereon, including a cone surface (17), a tubular side surface (18) and a pair of indenting surfaces (19 and 20). The second plate has a slit cut thereinto, the slit being designated by a line (21) in FIG. 2A. Most preferably the cone surface (17) is centrally located. The slit (21) is formed by simply cutting into the second plate (15) with a razor blade, the slit being made along a radius into the plate (16) to a depth of at least the center of the cone surface (17). FIGS. 2B and 2C illustrate the method of making the second plate (15). FIG. 2B is a cut-away view of a mold used for casting the second plate. The mold is comprised of a plastic block (22) having a hole of a desired diameter therein. The hole in the block (22) is partially filled with a brass cylinder (23) which has a small, centrally located conic indentation therein. The brass cylinder (23) has a diameter of approximately the same size as the diameter of the hole in the plastic block (22). The conic indentation is positioned upward, as shown in FIG. 2B. A silicone rubber mixture is prepared and is poured into the mold formed by the block (22) and the brass cylinder (23). The rubber cures in order to form the second plate (15). The brass and rubber are then simultaneously extruded from the block, and the second plate is slit by a first cut and has second cuts made in order to form both indented surfaces 19 and 20. FIG. 2C illustrates a top view of the block (22) having the second plate (15) cast therein.

The second plate, once slit, has a textile yarn (30) positioned therein, the yarn emerging from the slit at the center of the cone (17). The yarn (30) and second plate (15) together are then securely positioned in a mount (23), as shown in FIG. 3B. A nut (24) is then dropped down over the second plate, the nut (24) having had the yarn threaded therethrough. The top surface (25) of the nut is approximately 1/16th inch higher than the top surface (16) of the second plate (15). A nondeformable plate (3), having a centrally located perforation therein, has the yarn (30) threaded therethrough and is dropped down onto the upper surface of the second plate (15), the perforation centering around the conic protrusion on the second plate (15), as shown in FIG. 3B. The second plate (15) and the nondeformable plate (3) together form a cup-shaped reservoir which has a yarn (30) positioned therethrough. The reservoir is then filled with silicone rubber, and the rubber is allowed to cure therein. Upon curing, the nut (24) is raised from the second plate (15) which in turn raises the nondeformable plate (3) containing the inner portion (2) from the second plate (15). The yarn is then carefully removed from the slit (21) in the second plate (15). The inner portion (2) is not easily removed from the nondeformable plate (3) because the two inner perimeter surfaces (7 and 8) of the nondeformable plate (3) hold the inner portion (2) in place.

FIG. 3A illustrates a method of making, stringing up, and installing two dies of the present invention. A spool (not shown) of textile strand (30) material is positioned below the mounting bracket (23). A yarn treatment chamber/die holder (31) is positioned several inches above the mounting bracket (23). The strand (30) is directed through the mount (23) and through the slit of a "first" second plate (15), through a first nut (24), through a first nondeformable plate (3), through a first washer (32), through the yarn treatment chamber (31), through a second washer (32'), through a second nondeformable plate (3'), through a "second" second plate (15), through a second nut (24') and through a second position in the mount (23), the yarn (30) being held in position by both the "first" and "second" second plates (15 and 15'). The nondeformable plates (3 and 3') are then positioned on top of their respective second plates (15 and 15'), forming the configuration shown in FIG. 3B. The washers (32 and 32') are positioned immediately above the nondeformable plates (3 and 3'). Desired amounts of silicone rubber were added to the cup-shaped reservoirs formed by the second plates (15 and 15') in combination with their respective nondeformable plates (3 and 3'). The silicone rubber is then allowed to cure. After curing, the washers (32 and 32') and the dies are raised up into contact with the treatment chamber/die holder (31) by separating the nuts (24 and 24') from the second plates (15 and 15') without disturbing the yarn (30). The nuts (24 and 24') are raised up and screwed onto the threaded ends of the die holder (31). The yarn is then cut between the first second plate (15) and the spool (not shown). The yarn is then freed from the second plates (15 and 15'), and an assembly of two nuts (24 and 24'), two dies, two washers (32 and 32'), and the die holder/treatment chamber (31) may be positioned in a pipe which is designed to hold the assembly. The die holder (31) has two rubber O-rings (33) used to allow a coating mix to travel through the holder (31) without leaking around the outside of the holder. This design also allows the die holder (31) to be easily removed for casting new orifices.

EXAMPLE I

Making the Second Flexible and Slittable Plate

A 0.0625 inch diameter hole was drilled 0.03125 inches deep concentric with the longitudinal axis of a 0.375 inch diameter brass rod 0.4375 inches long. The drill had a 30° cutting angle except for the central 0.020 inch portion which had a 0° cutting angle.

A 0.375 inch diameter hole was drilled through a 1.0 inch thick methyl methacrylate (Plexiglas TM) plate. The brass rod was placed in the bottom of the hole in the Plexiglas TM with the 0.0625 inch diameter conical indentation facing upward.

Ten parts of Type J RTV Silicone Rubber and one part of Type J hardener, both manufactured by Dow Corning Corporation, Midland, Mich., were mixed with 0.1 parts of carbon black in a paper cup. The mixture was placed in a 10 cc. disposable syringe and extruded into the hole in the Plexiglas TM. The Plexiglas TM plate and the remaining mixture were placed in a chamber held at a vacuum of 30 mm. of mercury for five minutes to de-air the mixture. After the Plexiglas TM plate was removed from the vacuum chamber, the syringe was used to fill the hole in the Plexiglas TM plate, the hole being filled with the de-aired mixture. The silicone rubber was allowed to cure for 16 hours at room temperature. Then the brass rod and the second plate formed by the silicone rubber were pressed out of the Plexiglas TM plate and the brass rod was separated from the second plate. A razor blade was used to slit the second plate in a plane from the side to the centerline where the truncated conical protrusion had been formed.

Making the Flexible Orifice

A mixture of 95% heptane and 5% petroleum jelly was applied to the second plate and allowed to dry to prevent sticking of the cured die to the second plate.

A 24 denier polycaprolactam yarn (herein termed the "stringup yarn") segment was threaded through a centrally located hole having a diameter of 0.156 inches in a 316 stainless steel disk having an outside diameter of 0.50 inches and a thickness of 0.040 inches. This disk served as the nondeformable plate. The perforation was "doubly countersunk", with the interior perimeter walls (7 and 8) of the nondeformable plate forming an included angle of 62°. The end of the yarn segment which was threaded through the perforation was then secured in the slit of the second plate, the yarn emerging from the second plate from the center of the conical protrusion. The nondeformable plate was centered and positioned on top of the second plate. The yarn segment above the nondeformable plate was clamped in a substantially vertical position, as shown in FIG. 3B.

Seven grams of Type 3110 RTV silicone rubber were mixed in a wax-free paper cup with 21 microliters of Type 4 Hardener, both manufactured by Dow Corning Corporation, Midland, Mich. The silicone rubber used is described in detail in a Dow Corning Bulletin, No. 61-244 published in January of 1974, the Bulletin entitled *"Application ideas . . . using silicone moldmaking materials"*, which is herein incorporated by reference. The mixture was placed in a 10 cc. disposable syringe equipped with a 16 gauge needle 0.5 inches long. A carefully controlled amount of the mixture was extruded into the reservoir formed by the nondeformable plate, the second plate and the yarn segment. The mixture remained extrudable for at least 10 minutes. After 60 minutes at room temperature, the rubber was sufficiently cured to allow separation of the die (containing the yarn segment) from the second plate.

Stringing Up the Flexible Orifice

A 7 denier polycaprolactam monofilament was tied to the 24 denier stringup yarn segment which was then used to pull the 7 denier yarn completely through the flexible orifice. The stringup yarn had a length of about 24 inches.

EXAMPLE II

Two substantially identical thin, flexible dies were produced by the method shown in FIG. 3A. After the silicone rubber used to make the flexible inner portions of both dies had hardened, the nuts (24 and 24') were raised up, the nuts carrying with them both of the dies and both of the washers (32 and 32'), the nuts being screwed onto the threaded ends of the treatment chamber/die holder (31). This process sealed the dies in place. The filament (30) remained in the position shown in FIG. 3A. Upon securing the nuts (24 and 24') to the treatment chamber/die holder (31), the filament (30) was removed from the slits of the second plates, and the filament was cut below the "first" second plate (15). The combination of the nuts, the dies, the washers, and the die holder are herein termed the coating mix applicator and the yarn segment therethrough was of course the stringup yarn. The coating mix applicator together with the stringup yarn were together positioned in a holder (40) shown in FIG. 4.

A 7 denier polycaprolactam monofilamentary yarn, having an average diameter of 30 microns, was supplied from a pirn (42) mounted above the mix applicator and stringup yarn, as shown in FIG. 4. The 7 denier yarn was manufactured by Badische Corporation, of Anderson, S.C. The end of the 7 denier yarn was tied to the upstream end of the stringup yarn segment. By pulling on the downstream end of the stringup yarn segment, the 7 denier yarn was strung up through both dies. The 7 denier yarn was then directed through a 10 meter long evaporation tube (43), the tube having a counter current flow of 160° C. moving at 2200 feet per minute moving therethrough. The yarn was then wound 4 times around a pair of rollers (41), the process being depicted by FIG. 4. Both rollers had a surface speed of 690 meters per minute with the larger roller having a diameter of 10 centimeters. The yarn was then taken up on a pirn.

The die holder (31) was approximately 55 millimeters long and had a 10 millimeter ID, and had a centrally located coating mix applicator passageway (35) therethrough, the coating mix applicator passageway having a diameter of approximately 10 millimeters. The dye holder (31) together with the stringup yarn (30) were inserted into a rectangular block-shaped mount (shown schematically as 40), the block mount having a round passageway sized so that O-rings (33) created a sealed fit therein. Upon installation of the dye holder, the mix passageway (35) aligned with a coating mix supply passageway in the mount. The mix was then pumped into and through the dye holder (31) after yarn motion was at 690 meters/minute.

The process illustrated in FIG. 4 was used to produce an electrically-conductive textile fiber as described in U.S. Pat. No. 3,823,035. The "mix" which was pumped into the die holder (31) was as follows: 90% liquid, 10% solids, the liquid being 68% formic acid, 32% water, the solids being 60% carbon black particles (30 mu) and 40% polycaprolactam polymer. The process was carried out largely as Example I of U.S. Pat. No. 3,823,035 was described, except that the resilient, dilatable orifices allowed the filament to be momentarily immersed in the acid/polymer/carbon black mixture, rather than padding the mix on the fiber. The strand was found to have "slubs" (enlarged regions where drawing had been incomplete) thereon which had diameters significantly greater than the diameter of the stringup yarn, but the slubs did not cause the yarn to break, but instead passed through the orifices. Of course, the process could be carried out by using only one die, this die being downstream of and in contact with the mix, just as in this example. However, the mix itself would have to be pumped into an applicator which did not have an upper die, i.e., the applicator would be open to the atmosphere. This would necessitate supplying mix to the applicator in a manner so that the mix would not "overflow" in an uncontrolled manner. Two dies are preferred because the mix can be pumped under pressure without "overflow" and because mix fumes are kept from the atmosphere, benefiting those working around operating equipment and keeping the mix from being affected by the open atmosphere.

The device of the present invention has been specified in detail with respect to certain preferred embodiments thereof. As is understood by those of skill in the art, variations in this detail may be effected without any departure from the spirit and scope of the present invention, as defined in the following claims.

We claim:

1. A process for both making and stringing up a dilatable coating die, the process comprising the steps of:
   (a) mounting a substantially nondeformable plate in a horizontal position, the nondeformable plate having at least one internal surface which defines a perforation which is through the nondeformable plate, the internal surface being shaped in order to provide a fastening surface for a material which is to be cast within the perforation; and
   (b) threading a yarn segment through the perforation, the yarn having a diameter d which is the same size as a desired diameter for a dilatable passageway which is to be produced in an inner flexible portion of the coating die; and
   (c) positioning the yarn in a slit, the slit being within a second plate which has been slit partially therethrough, the second plate being both flexible and slittable, the second plate having a protrusion of a desired size which is integral therewith, the protrusion being out of the plane of the second plate, the slit passing through the protrusion, the protrusion being shorter than the thickness of the nondeformable plate, the protrusion fitting wholly within the perforation, the second plate being mounted directly underneath the nondeformable plate with the protrusion and the yarn being positioned within the perforation of the nondeformable plate so that a generally cup-shaped reservoir is formed, the yarn being positioned within the reservoir so that the yarn is, in every direction, spaced substantially at least a distance d from the internal surface which defines the perforation, the yarn positioned within the slit so that the yarn emerges from the protrusion at a desired distance from a top surface of the nondeformable plate upon positioning the nondeformable plate, the yarn, and the second plate to form the reservoir; and (d) filling the reservoir with a castable material which is compatible with the yarn, the slit plate, and the nondeformable plate, the castable material filling the reservoir to a point above the tip of the protrusion, the amount of castable material added to the reservoir being carefully controlled in order to control the length of the passageway which is to be formed through the castable material, the material being of a type such that upon hardening the material will have a Shore A Hardness Value between 20 and 100; and (e) allowing the castable material to harden sufficiently; and (f) removing the second plate while leaving the yarn segment threaded through the cast portion of the die.

2. A process as described in claim 1, wherein the L/d of the second passageway is between 3 and 20.

3. A process as described in claim 1, wherein upon curing the castable material, the castable material obtained a Shore A Hardness Value between 30 and 60.

4. A process as described in claim 3, wherein the Shore A Hardness Value is approximately 40.

5. A process as described in claim 1, wherein the nondeformable plate is made from 316 stainless steel.

6. A process as described in claim 1, wherein the yarn segment is a segment of a textile yarn.

7. A process as described in claim 6, wherein the textile yarn is a monofilament.

8. A process as described in claim 2, wherein the L/d of the passageway is between 5 and 15.

9. A process as described in claim 8, wherein the L/d of the passageway is approximately 10.

10. A process as described in claim 1, wherein a circular keyway is formed by opposing countersunk surfaces which form the perforation through the nondeformable plate.

11. A process as described in claim 1 wherein a second smaller yarn to be coated is fastened to the stringup yarn, the second yarn then being pulled through both dies within the mix applicator by pulling the stringup yarn completely out of the mix applicator.

* * * * *